United States Patent
Hong

(10) Patent No.: US 8,189,914 B2
(45) Date of Patent: May 29, 2012

(54) IMAGE FORMING APPARATUS AND CONTROL METHOD THEREOF

(75) Inventor: Jin Kyung Hong, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1011 days.

(21) Appl. No.: 12/125,258

(22) Filed: May 22, 2008

(65) Prior Publication Data

US 2009/0091801 A1 Apr. 9, 2009

(30) Foreign Application Priority Data

Oct. 9, 2007 (KR) .................. 10-2007-0101455

(51) Int. Cl.
*G06K 9/00* (2006.01)

(52) U.S. Cl. ............... 382/172; 382/162; 382/163

(58) Field of Classification Search .......... 382/172, 382/318, 162, 163, 305, 167; 348/370, 371, 348/224.1; 358/497, 463, 464, 1.15, 1.9, 358/1.14

See application file for complete search history.

(56) References Cited

U.S. PATENT DOCUMENTS

| | | | | |
|---|---|---|---|---|
| 5,453,848 | A | * | 9/1995 | Park et al. ............... 358/464 |
| 7,545,529 | B2 | * | 6/2009 | Borrey et al. ............ 358/1.15 |
| 2007/0003157 | A1 | | 1/2007 | Eschbach et al. |

OTHER PUBLICATIONS

Sharma, "Show-Through Cancellation in Scans of Duplex Printed Documents", IEEE, vol. 10, Issue 5, 2001, pp. 736-754.*

* cited by examiner

*Primary Examiner* — Anh Hong Do

(74) *Attorney, Agent, or Firm* — Stanzione & Kim, LLP

(57) ABSTRACT

An image forming apparatus and a control method thereof include an adaptive threshold, which can be adapted for every block dividing an entire scanned region of a document, is set. A brightness value of original brightness data of the document is disregarded, and is substituted by a brightness value of background color data corresponding to the block, by use of a brightness threshold and a color difference threshold set as the adaptive threshold based on difference between brightness of the blocks and difference between color differences of the blocks. Accordingly, there is no problem of back surface noise such that an undesired object of a back surface of the duplex-printed document appears on a scan image in scanning a front surface of the document.

26 Claims, 17 Drawing Sheets

IMAGE FORMING APPARATUS AND CONTROL METHOD THEREOF

CROSS-REFERENCE TO RELATED APPLICATIONS

This application claims priority under 35 U.S.C. §119(a) from Korean Patent Application No. 2007-0101455, filed on Oct. 9, 2007 in the Korean Intellectual Property Office, the disclosure of which is incorporated herein in its entirety by reference.

BACKGROUND OF THE INVENTION

1. Field of the Invention

The present general inventive concept relates to an image forming apparatus and a control method thereof, and more particularly, to an image forming apparatus and a control method thereof to decrease an influence of back surface noise due to an object of a back surface of a document appears on a scan image in scanning a duplex-printed document.

2. Description of the Related Art

Generally, an image forming apparatus having a scan function refers to an apparatus which generates a scan image and prints the image on a printing paper. There is a digital multi-function printer as an example of such an apparatus.

As illustrated in FIG. 1, in an image forming apparatus having a scan function, in order to scan a document and obtain a scan image, a cover 2 is positioned above a document 1, and a fluorescent lamp 3 is operated. Light emitted from the lamp 3 is reflected from the cover 2, permeates a printing paper, and is transferred to an image sensor 4. Accordingly, in a case where the document 1 is a document, in which objects are printed on a front surface and a back surface, i.e., a duplex-printed document, a scan image obtained by the image sensor 4 includes an object 1b on the back surface of the document as well as an object 1a on the front surface of the document.

As such, when a scan image obtained by scanning an object of a desired surface of the document includes an object of an undesired surface, readability with respect to a printing result of printing the scan image is deteriorated.

In order to generate a scan image of good quality, an object of an undesired surface should be removed in a post-processing of scan data obtained by a scan device. Only when a scan image, from which an object of an undesired surface is removed, is printed, a printing result with good readability can be obtained.

When the fluorescent lamp 3 is operated to scan a thin document, light from the fluorescent lamp 3 permeates the document, and is transferred to the image sensor. By this process, an object of an undesired surface appears blurredly on a scan image. Brightness of the object of the undesired surface is between brightness of a text and brightness of a background color. Therefore, if the object of the undesired surface included in the scan image as a normal image is not printed, but the object is treated as the background color, undesired back surface noise can be prevented from being printed.

According to prior art, brightness of a scan image was checked one by one, and then a threshold was set as a reference of treatment of the background color, so as to cope with back surface noise.

However, in the conventional method, in order to check brightness with respect to the entire scan data of one scanned surface and find a superior background color to set a threshold, a memory of a large capacity to store scan data of one surface is needed, and takes a long time to carry out a series of processing operations including setting of a threshold of the background color.

The prior art also discloses checking brightness information of a background color of an upper end portion of a document during an initial scanning process and uniformly treating the background color with respect to the entire region of the document based on the brightness information. In such a case, treatment time may be reduced. However, the treatment of the background color with respect to the entire document may be inaccurately performed, and may cause deterioration of an image quality of a printing result.

SUMMARY OF THE INVENTION

The present general inventive concept provides an image forming apparatus and a control method thereof, which can remove back surface noise due to an appearance of an object of an undesired surface from a scan image.

The present general inventive concept also provides an image forming apparatus and a control method thereof, which can shorten a treatment time by treating a background color while dividing a duplex-printed document into block units.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing an image forming apparatus including an image scanning unit to scan a duplex-printed document and output scan data, and an image processing device to compensate background color data of the scan data based on an adaptive threshold which can be adapted according to a scanned region of the document. The image processing device removes an object printed on a region except for the scanned region in scanning the document.

The image processing device may compensate the background color data with respect to a plurality of blocks, into which an entire scanned region of the document is divided, by block units.

The image processing device may include a color coordinate converting unit to convert the scan data into brightness/color difference data, and a histogram analysis unit to analyze a histogram of the brightness/color difference data.

The image processing device may further include an adaptive threshold setting unit to set the adaptive threshold for every block according to a frequency of a brightness value and a rate of change of the frequency in the brightness histogram analyzed by the histogram analysis unit, and an adaptive threshold storage unit to store the adaptive threshold.

The adaptive threshold setting unit may set a brightness value at the time of setting the adaptive threshold to a brightness threshold, and may set a color difference threshold corresponding to the brightness threshold.

The adaptive threshold setting unit may set a brightness threshold and a color difference threshold corresponding to the brightness threshold, based on difference between a brightness of the blocks and difference between color differences of the blocks.

The image processing device may include an image compensation unit. When brightness data of the scan data of the document is larger than a brightness threshold and color difference data corresponding to the brightness data is smaller than a color difference threshold, the image compensation unit may carry out compensating operation.

The image compensation unit may carry out the compensating operation by substituting the brightness value of the brightness data by a higher brightness value of the background color.

The image processing device may include an initial background value setting unit to set a minimum allowable brightness value and a maximum allowable color difference value to an initial background value by use of superior brightness data and superior color difference data of the scan data extracted from any one of the plurality of blocks.

The initial background value setting unit may extract the scan data from other blocks except for certain blocks of the plurality of blocks of the document.

The initial background value setting unit may exclude an upper end block of the document.

The initial background value setting unit may perform down sampling in extracting the scan data.

The foregoing and/or other aspects and utilities of the general inventive concept may also be achieved by providing a method to control an image forming apparatus, the method including scanning a duplex-printed document, setting a minimum allowable brightness value and a maximum allowable color difference value in scan data extracted from any one block with respect to a plurality of blocks, into which an entire scanned region of the document is divided, converting the scan data into brightness/color difference data by block units, and analyzing a brightness or color difference histogram with respect to the brightness/color difference data, setting an adaptive threshold which can be adapted for every block according to a frequency of a brightness value and a rate of change of the frequency in the brightness histogram, and compensating background color data of the scan data by use of the adaptive threshold set by block units.

The setting the adaptive threshold may include setting a brightness value at a time of setting the adaptive threshold to a brightness threshold, and setting a color difference threshold corresponding to the brightness threshold.

The setting the adaptive threshold may include setting a brightness threshold corresponding to the adaptive threshold and a color difference threshold corresponding to the brightness threshold, based on a difference between a brightness of the blocks and a difference between color differences of the blocks.

The compensating the scan data may be achieved when brightness data of the scan data of the document is larger than a brightness threshold and color difference data corresponding to the brightness data is smaller than a color difference threshold.

The compensating the scan data may include substituting the brightness value of the brightness data by a higher brightness value of the background color.

The foregoing and/or other aspects and utilities of the general inventive concept may also be achieved by providing a method to control an image forming apparatus, the method including scanning a duplex-printed document and a test patch printed with a verification pattern to verify whether back surface noise occurring in scanning the document is compensated, analyzing a brightness histogram by block units, into which a scanned region of the duplex-printed document is divided, compensating background color data of scan data of the document by use of an adaptive threshold set for every block according to a frequency of a brightness value and a rate of change of the frequency in the brightness histogram, and printing the verification pattern of the patch by applying the adaptive threshold set for every block.

The verification pattern may be printed such that a range of a printed region is changed according to the adaptive threshold.

The foregoing and/or other aspects and utilities of the general inventive concept may also be achieved by providing an image forming apparatus including an image scanning unit to scan a duplex-printed document and output scan data, and an image processing device to identify and remove back surface noise due at least to an unwanted object scanned, wherein the removal of the back surface noise is accomplished through compensation of background color data.

The unwanted object scanned can be located on an opposite side of the duplex-printed document being scanned with respect to the image scanning unit.

The background color data can be compensated for by outputting the unwanted object with a same brightness as a background color.

The foregoing and/or other aspects and utilities of the general inventive concept may also be achieved by providing a method of removing an appearance of unwanted scanned object of an image forming apparatus, the method including scanning a duplex-printed document, outputting scan data, identifying the back surface noise due at least to an unwanted scanned object, and removing the identified back surface noise is accomplished through compensation of background color data.

The foregoing and/or other aspects and utilities of the general inventive concept may also be achieved by providing a computer-readable recording medium having embodied thereon a computer program to execute a method, wherein the method including scanning a duplex-printed document, outputting scan data, identifying back surface noise due at least to an unwanted object scanned, and removing the identified back surface noise is accomplished through compensation of background color data.

The foregoing and/or other aspects and utilities of the general inventive concept may also be achieved by providing an image forming apparatus including an image processing device configured to receive scan data, and to remove a portion of the scan data according to a pattern of another portion of the scan data.

The image forming apparatus may further include a scanning unit to scan a document having a first surface and a second surface opposite to the first surface to generate the scan data according to images of the first surface and the second surface of the document, wherein the portion of the scan data corresponds to the image of the second surface and the another portion of the scan data corresponds to the image of the first surface.

The image forming apparatus may further include a print unit to print the another portion of the scan data.

The pattern of the another portion of the scan data may correspond to brightness and color.

The another portion of the scan data may include color data, and the color data may be adjusted according to a removal of the portion of the scan data.

The portion and the another portion may have an area to overlap each other.

BRIEF DESCRIPTION OF THE DRAWINGS

These and/or other aspects and utilities of the exemplary embodiments of the present general inventive concept will become apparent and more readily appreciated from the following description of the embodiments, taken in conjunction with the accompanying drawings, of which:

FIGS. 4B and 4C show a second pattern of a brightness histogram of a block of scan data according to an embodiment of the present general inventive concept, in which FIG. 4B illustrates that a number of peaks of a bright histogram is two, and FIG. 4C illustrates that a number of peaks of a bright histogram is three;

DETAILED DESCRIPTION OF THE PREFERRED EMBODIMENTS

Figure 1:
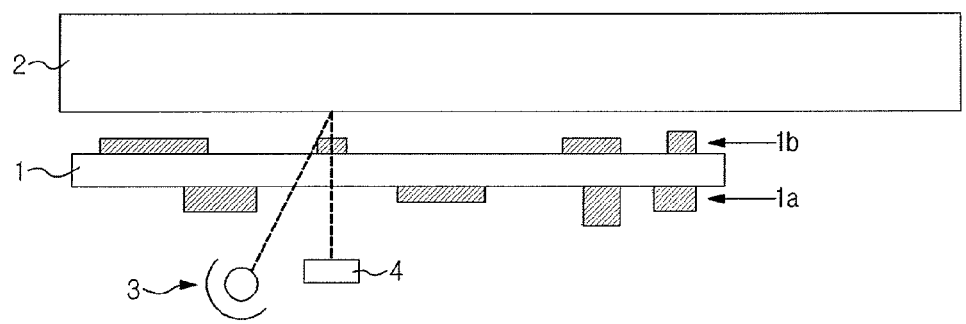
FIG. 1 is a view illustrating an operation of scanning a duplex-printed document.

Reference will now be made in detail to exemplary embodiments of the present general inventive concept, examples of which are illustrated in the accompanying drawings, wherein like reference numerals refer to like elements throughout. The embodiments are described below to explain the present general inventive concept by referring to the figures.

Figure 2:
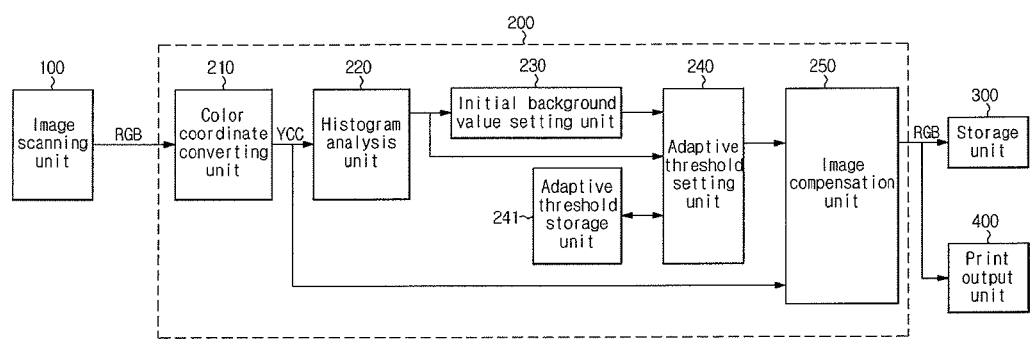
FIG. 2 is a control block diagram illustrating an image forming apparatus according to an embodiment of the present general inventive concept.

FIG. 2 is a control block diagram illustrating an image forming apparatus according to an embodiment of the present general inventive concept.

As illustrated in FIG. 2, an image forming apparatus according to an embodiment of the present general inventive concept includes an image scanning unit 100, an image processing device 200, a storage unit 300 and a print output unit 400.

The image scanning unit 100 includes a fluorescent lamp and an image sensor. General constitutional components illustrated in FIG. 1 may be applied to the image scanning unit 100.

The image scanning unit 100 serves to transmit scan data of the image sensor to the image processing device 200.

The image processing device 200 serves to make a histogram analysis of the scan data from the image scanning unit 100 by block units and to generate a scan image by compensating background color data according to an analysis result.

The storage unit 300 serves to store the scan image generated by the image processing device 200. The stored scan image may be used for print output, or may be transmitted externally through a communication network (not illustrated).

The print output unit 400 serves to receive directly the scan image generated by the image processing device 200 and to print output the scan image to a printing medium, or serves to print output the scan image stored in the storage unit 300. The print output unit 400 may perform the print output through various print types, such as an ink jet type or an electrophotographic type.

The image processing device 200 includes a color coordinate converting unit 210, a histogram analysis unit 220, an initial background value setting unit 230, an adaptive threshold setting unit 240, an adaptive threshold storage unit 241 and an image compensation unit 250.

Figure 3:
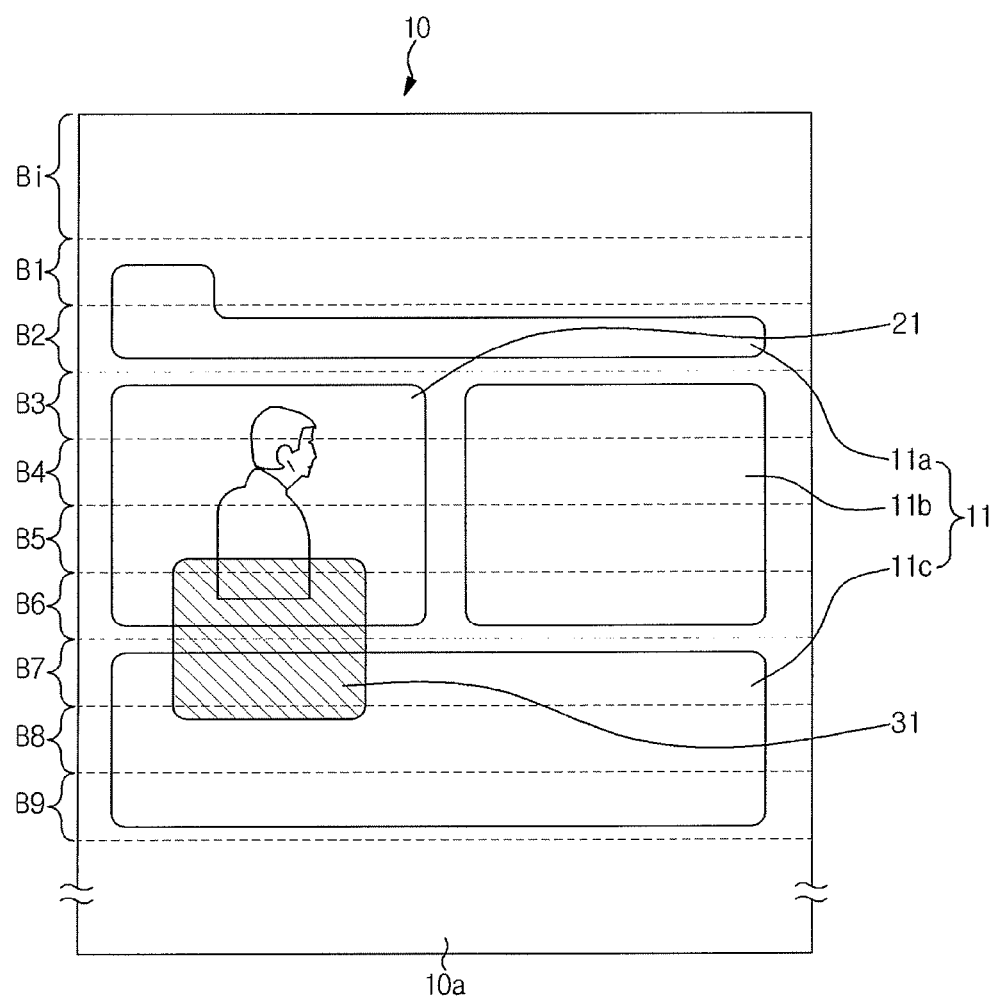
FIG. 3 is a view illustrating a constitution of a duplex-printed document employed in the present general inventive concept.

Prior to explaining an operation of the image processing device 200 to process the scan data, configuration of a duplex-printed document employed in the present general inventive concept will be explained. As illustrated in FIG. 3, a front surface 10a of a duplex-printed document 10 is printed with a first object 11 including text regions 11a, 11b and 11c and a second object 21 including an image region. As described above, in the scanning process of the image scanning unit 100, an object of a back surface of the document 10 may be input to the image sensor, and as a result an undesired object, e.g., an object 31 on the back surface of the document (see FIG. 3), may be included in the scan data.

The color coordinate converting unit 210 serves to convert the RGB scan data from the image scanning unit 100 into brightness/color difference data YCC and then transmit the brightness/color difference data to the histogram analysis unit 220.

The histogram analysis unit 220 generates histograms corresponding to brightness Y and color differences Cr and Cb by block units from the brightness/color difference data YCC transmitted thereto, and makes a histogram analysis by block units.

At this time, the histogram analysis unit 220 excludes an upper end portion of the document from the object to be analyzed. For example, a front end block Bi of the document illustrated in FIG. 3 is skipped and is not subjected to analysis. This is because the front end block Bi of the document is not typically printed with an image, or is a discolored portion, or is an ornamental portion of the document. Further, analysis information about the front end block Bi of the document makes little contribution to compensate for background color data which will be described later. In this embodiment, the front end block Bi of the document is set to fifteen lines. However, the front end block Bi of the document is not limited to fifteen lines, and a size of the block can be varied as needed.

In FIG. 3, blocks B1 to B9 subsequent to the front end block Bi of a region of the document 10, in which texts, picture images and background images are printed, are substantially subjected to scan. In this embodiment, the blocks B1 to B9 are set to have the same size.

Figure 4A:
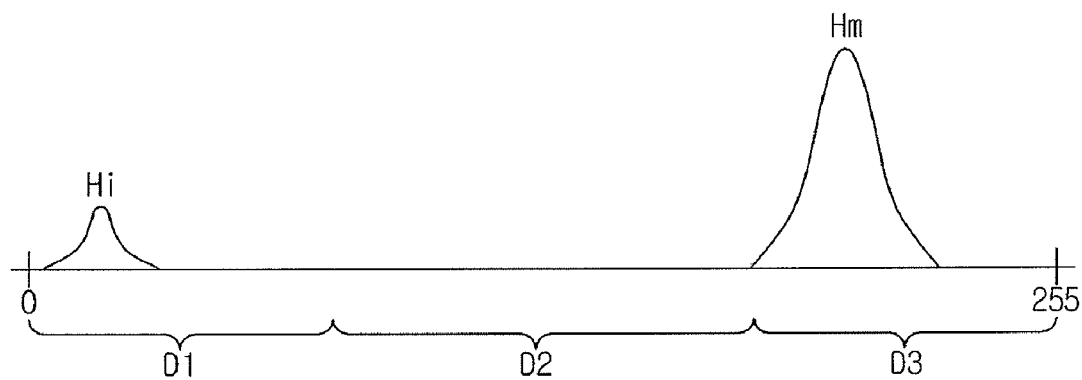
FIG. 4A illustrates a first pattern of a brightness histogram of a block of scan data according to an embodiment of the present general inventive concept, in which a number of peaks of a bright histogram is one.

In the brightness histograms generated by block units by the histogram analysis unit 220, a range of a brightness value is set to a 256 level (0~255). The text printed on the document with a dark and deep color has a brightness value distributed approximately to 0 in the brightness histogram, and the background color printed on the document with a light and bright color has a brightness value distributed approximately to 255 in the brightness histogram. Accordingly, as an example of the brightness histogram, as illustrated in FIG. 4A, the histogram Hi of the text is positioned in a first section D1 of a low brightness value, and the histogram Hm of the background color is positioned in a third section D3 of a high brightness value. Such a brightness histogram has a pattern such that the histogram has a single peak in the bright region.

Figure 4B:
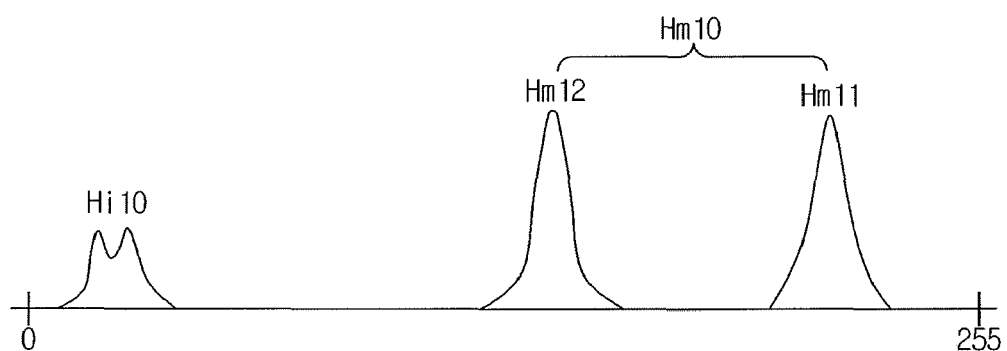

Although not illustrated in FIG. 4A, the histogram of medium brightness may be positioned in a second section D2. That is, as another example of the brightness histogram, as illustrated in FIG. 4B, a single histogram Hi10 of a relatively low brightness value and two histograms Hm10 (Hm11 and Hm12) of a relatively high brightness value may appear. Here, of the two histograms Hm11 and Hm12, one histogram Hm11 of a relatively high brightness value may correspond to the background color of the document, and the other histogram Hm12 of a relatively low brightness value compared to the histogram Hm11 may correspond to the picture image.

Figure 4C:
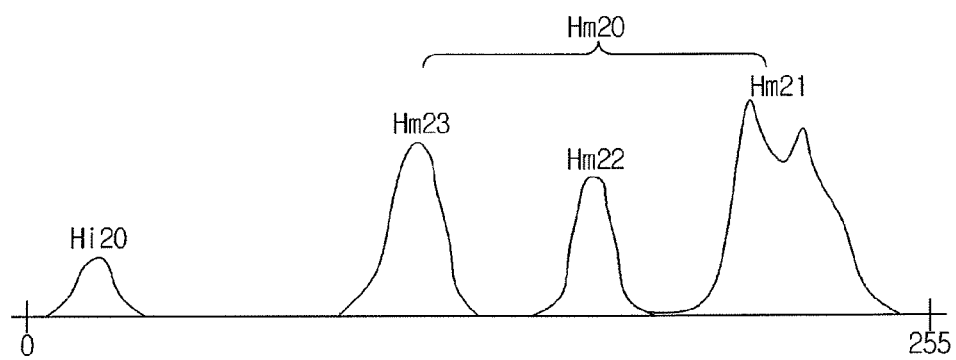

Also, as illustrated in FIG. 4C, a single histogram Hi20 of a relatively low brightness value and three histograms Hm20 (Hm21, Hm22 and Hm23) of a relatively high brightness value may appear.

The histograms illustrated in FIGS. 4B and 4C have a pattern such that the histograms have a plurality of peaks in the bright region.

Referring again to FIG. 3, the object 31 on the back surface of the document 10 may be included in the scan data in the scanning process of the image scanning unit 100, and the brightness histogram of the object 31 on the back surface has a feature of being positioned adjacent to the brightness histogram of the background color having a high brightness value. In general, the brightness histogram of the object 31 on the back surface of document is positioned in the second section D2 or at the boundary between the second section D2 and the third section D3.

The simplest method to remove the undesired object of the back surface of the document is to treat the object of the back surface of the document as well as the original background color as a light and bright background color. Accordingly, the object of the back surface of the document does not appear blurry in the print output process, but is output with the same brightness as the background color, thereby eliminating any influence of back surface noise.

To achieve this, a process of adaptively setting a threshold of a reference to process the background color by block units is required.

In the image forming apparatus according to an embodiment of the present general inventive concept to satisfy such a requirement, the adaptive threshold setting unit 240 sets an adaptive threshold with respect to the background color by block units.

Prior to setting the adaptive threshold, the initial background value setting unit 230 sets an initial background value IBV which is applied to the brightness histogram. The initial background value makes a contribution to validity of the adaptive threshold set by block units and enhancement of reliability of the setting of the adaptive threshold.

This embodiment is configured such that the initial background value setting unit 230 sets the initial background value with respect to the first block B1 following the front end block only once, whenever one surface of the document is scanned, however this is not limited thereto. The object block of the initial background value setting and the number of settings can be changed as needed.

The initial background value setting is not carried out with respect to all scan data of the first block B1 which is an object of the initial background value setting. To reduce the time required for the initial background value setting, a down sampling method is employed to set the initial background value with respect to a part of the block. According to the down sampling method, a quarter of the entire scan data is extracted, for example, the scan data corresponding to one pixel of every four pixels is extracted.

The initial background value setting unit 230 checks superior brightness data Y' and superior color difference data Cb' and Cr' of the brightness histograms of the extracted scan data. Here, the superior brightness data and the superior color difference data refer to brightness and color difference of high frequency, respectively, in the extracted scan data. This is to consider that the initial background value setting is not carried out with respect to all scan data but with respect to a portion of the scan data.

So as for the brightness threshold, as one of the adaptive threshold set finally, not to become too small or so as for the color difference threshold, as the other one of the adaptive threshold, not to become too large, the initial background value setting unit 230 sets a minimum allowable brightness value min_L and a maximum allowable color difference value deltach based on the superior brightness data Y'.

The initial background value setting unit 230 compares the superior brightness data Y' with a minimum reference value Yr1 and a maximum reference value Yr2, and sets the minimum allowable brightness value min_L according to the comparative result. Then, the initial background value setting unit 230 sets the maximum allowable color difference value deltach. In this embodiment, the minimum reference value Yr1 is set to 120, and the maximum reference value Yr2 is set to 200.

If the superior brightness data Y' is lower than the minimum reference value Yr1, the initial background value setting unit 230 sets the minimum allowable brightness value min_L from the following equation 1. If the superior brightness data Y' is not lower than the minimum reference value Yr1 and is higher than the maximum reference value Yr2, the initial background value setting unit 230 sets the minimum allowable brightness value min_L from the following equation 2. If the superior brightness data Y' is not lower than the minimum reference value Yr1 and is not higher than the maximum reference value Yr2, the initial background value setting unit 230 sets the minimum allowable brightness value min_L from the following equation 1.

The initial background value setting unit 230 sets the maximum allowable color difference value deltach from the following equation 3.

$$\text{Minimum allowable brightness value } min\_L = (Y'/2) + K1 \quad \text{Eq. 1}$$

$$\text{Minimum allowable brightness value } min\_L = (Y'/2) + K2 \quad \text{Eq. 2}$$

$$\text{Maximum allowable color difference value } deltach = |(Cb')^2 - (Cr')^2| + K1 \quad \text{Eq. 3}$$

Here, K1 equals 10, K2 equals 5, and Cb' and Cr' refer to superior color difference data of brightness histograms of extracted scan data.

The adaptive threshold setting unit 240 sets the adaptive threshold AT with respect to the blocks by block units, which will be explained by classification according to patterns of the above-described brightness histograms.

Figure 5A:
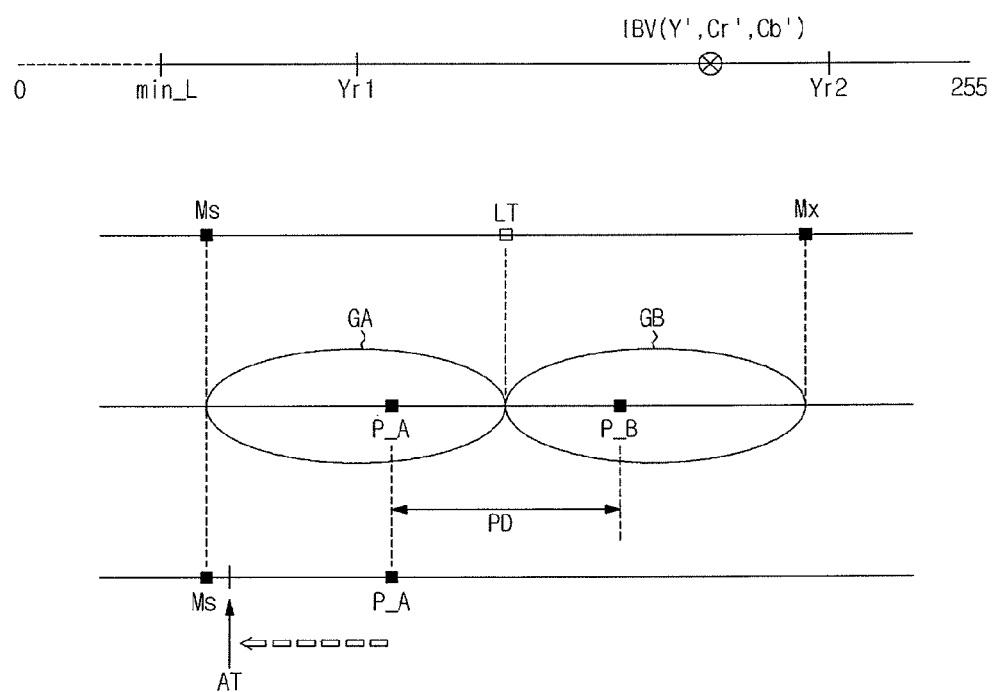
FIGS. 5A and 5B are views illustrating an operation of setting an adaptive threshold with respect to a first pattern of a brightness histogram according to an embodiment of the present general inventive concept.

In a case of the pattern of the histograms illustrated in FIG. 4A, the adaptive threshold setting unit 240 sets the adaptive threshold as illustrated in FIG. 5A. Describing in detail, a minimum value Ms and a maximum value Mx in the brightness histograms of a predetermined effective block are first set. When setting the minimum value Ms and the maximum value Mx, a value of 0 substantially corresponding to the brightness value of the text and a value of 255 substantially corresponding to the brightness value of the background color are excluded.

The adaptive threshold setting unit 240 sets a local threshold LT as a middle value between the minimum value Ms and the maximum value Mx. A region between the minimum value Ms and the local threshold LT is defined by a left group GA, and a region between the local threshold LT and the maximum value Mx is defined by a right group GB. The respective brightness values corresponding to the respective pixels of a predetermined block belong to the left group GA or the right group GB.

Figure 5B:
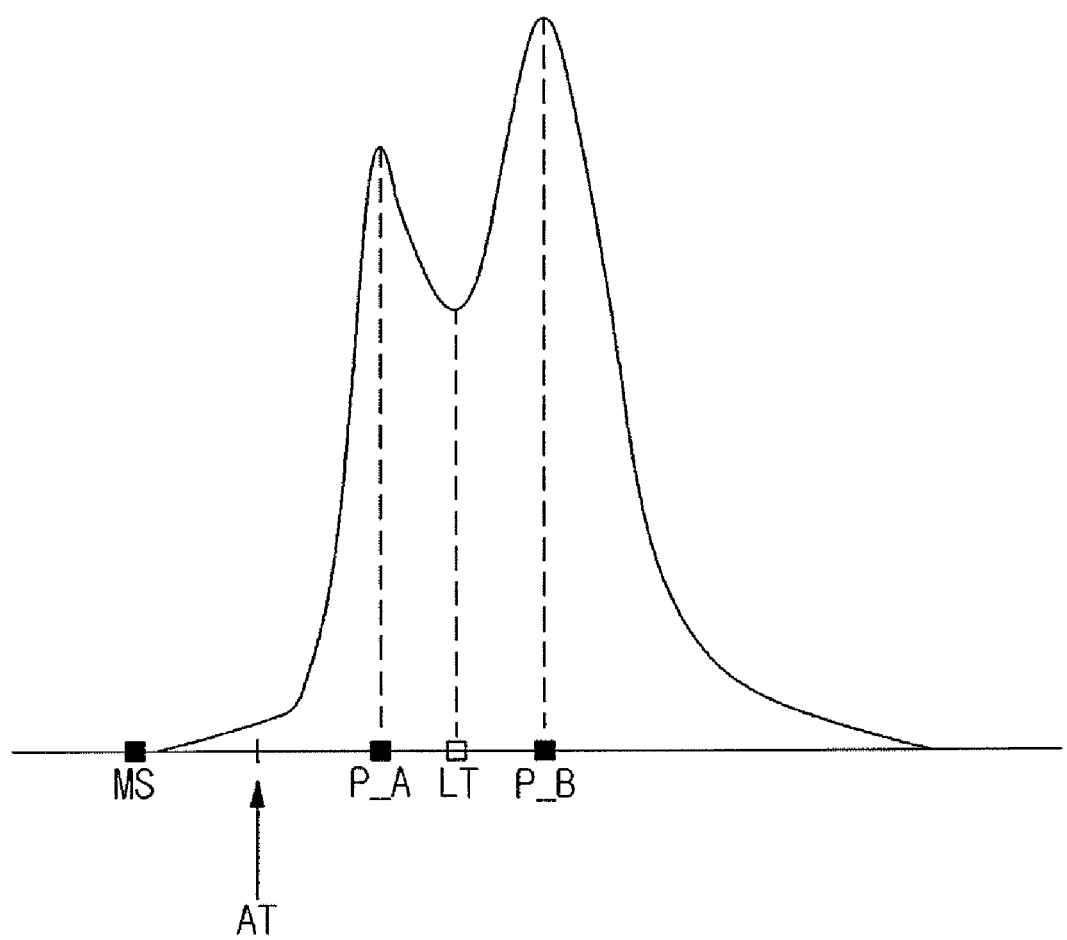

The adaptive threshold setting unit 240 checks a brightness value P_A of the highest frequency in the left group GA and a brightness value P_B of the highest frequency in the right group GB, and calculates a difference between the two brightness values of the highest frequency, i.e., a distance between groups PD. When comparing the distance between groups PD with a reference distance K3, if the distance between groups PD is smaller than the reference distance K3 (e.g., 20), a determination is made that there is a single peak of the brightness histogram in the bright region as illustrated in FIG. 4A. The adaptive threshold AT is set between the brightness value P_A of the highest frequency in the left group and the minimum value Ms of a relatively low brightness value. At this time, most of the brightness histograms are positioned at the right side of the adaptive threshold AT as illustrated in FIG. 5B. By treating the brightness data higher than the adaptive threshold AT as the background color, influence of undesired back surface noise can be decreased. A detailed explanation of the method of setting the adaptive threshold will be made later with reference to FIG. 7.

As another example, also in a case as illustrated in FIG. 4B or 4C, as described above, a minimum value Ms and a maximum value Mx in the brightness histograms of a predetermined block are set, and a local threshold LT is set as a middle value between the minimum value Ms and the maximum value Mx. A region between the minimum value Ms and the local threshold LT is defined by a left group GA1, and a region between the local threshold LT and the maximum value Mx is defined by a right group GB1. A brightness value P_A1 of the highest frequency in the left group GA1 and a brightness value P_B1 of the highest frequency in the right group GB1 are checked. When comparing a difference between the two brightness values of the highest frequency, i.e., a distance between groups PD with a reference distance K3, if the distance between groups PD is not smaller than the reference distance K3 (e.g., 20), a determination is made that there are a plurality of peaks of the brightness histograms in the bright region.

In such a case, since the brightness histogram in the left group can be considered to correspond to a normal picture image, it is excluded. An adaptive threshold AT1 is set between the brightness value P_B1 of the highest frequency in the right group and the local threshold LT of a relatively low brightness value. At this time, as illustrated in FIG. 6B, most of the brightness histograms in the right group are positioned at the right side of the adaptive threshold AT1. By treating the brightness data higher than the adaptive threshold AT1 as the background color, influence of undesired back surface noise can be decreased.

The method of setting the adaptive threshold will now be explained in more detail.

Figure 6A:
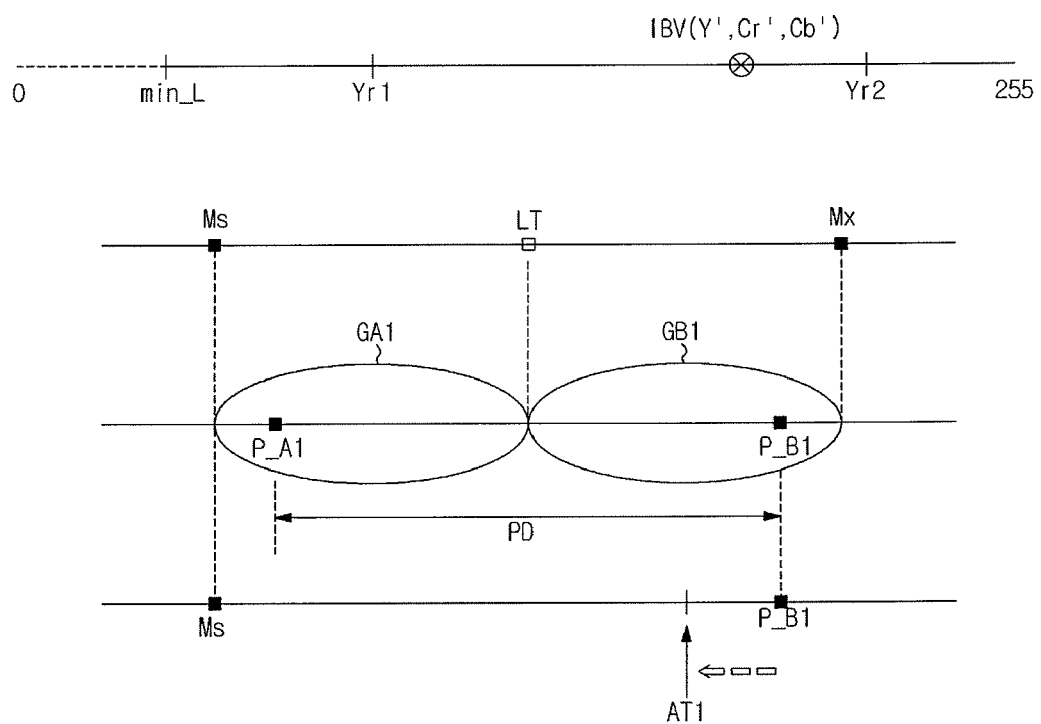
FIGS. 6A and 6B are views illustrating an operation of setting an adaptive threshold with respect to a second pattern of a brightness histogram according to an embodiment of the present general inventive concept.
Figure 6B:
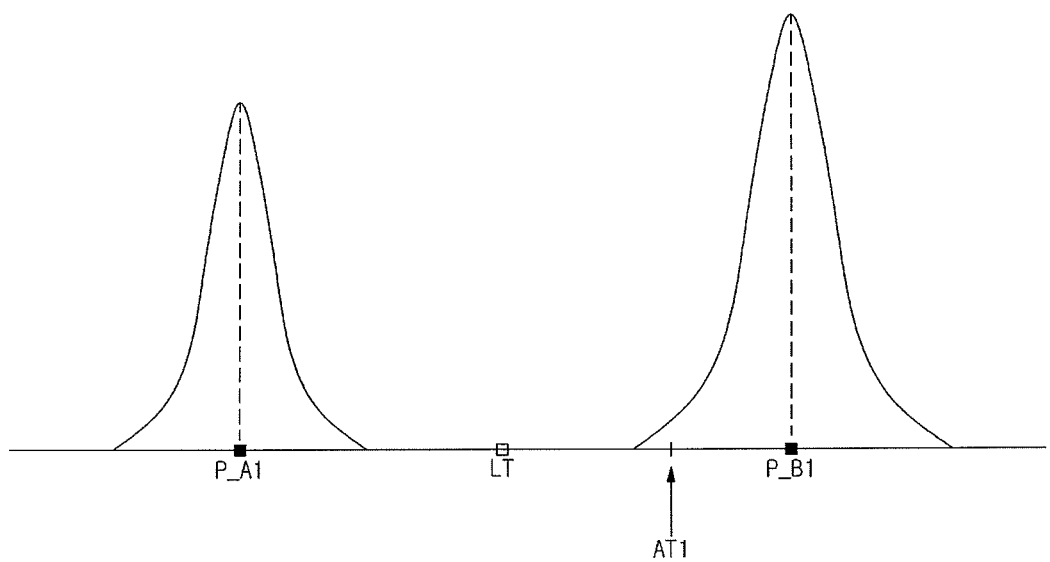
Figure 7:
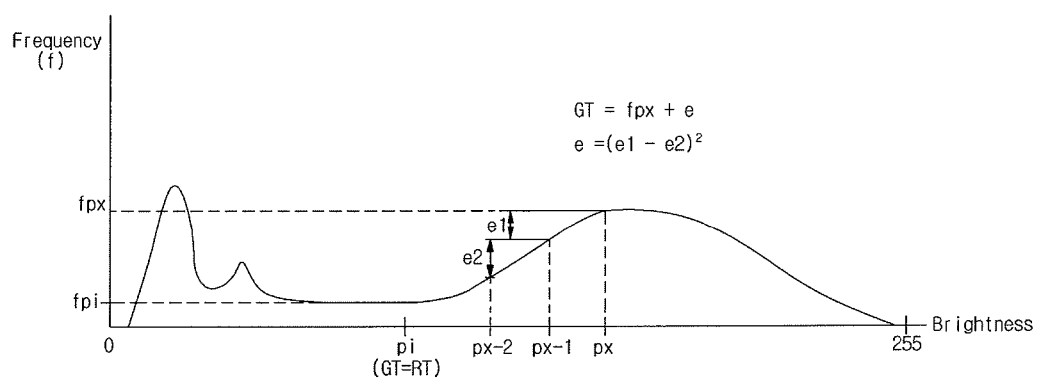
FIG. 7 is a graph illustrating a method of setting an adaptive threshold according to an embodiment of the present general inventive concept, which illustrates a frequency of a brightness value in a brightness histogram.

Referring to FIG. 7, once either the brightness value P_A of the highest frequency in the left group corresponding to a first pattern illustrated in FIG. 5A or the brightness value P_B1 of the highest frequency in the right group corresponding to a second pattern illustrated in FIG. 6A is determined, the respective brightness value is checked by stages whether the brightness value satisfies a condition of the adaptive threshold, starting from the brightness value of the highest frequency (hereinafter, referred to as "px"). At this time, this is checked by the adaptive threshold setting unit 240, based on a total of the frequency of each brightness value and a rate of change of the frequency. For example, the adaptive threshold setting unit 240 calculates a total GT of the frequency fpx of the highest brightness value px and a rate of change e of the frequency, and compares the total GT with the reference threshold RT. Here, the rate of change e of the frequency is calculated from a difference e1 between the frequency of the highest brightness value px and the frequency of a lower brightness value px-1 by one stage, and a difference e2 between the frequency of the lower brightness value px-1 by one stage and the frequency of a lower brightness value px-2 by two stages, as follows.

$$e=(e1+e2)^2, e1=[fpx]-[fpx-1], e2=[fpx-1]-[fpx-2]$$

From the comparative result, if the total GT with respect to the highest brightness value px is larger than the reference threshold RT, the total GT with respect to the lower brightness value px-1 by one stage is calculated by the same method as above, and is compared with the reference threshold RT. Such a process is continued until the total GT with respect to a certain brightness value reaches the reference threshold RT. For example, as illustrated in FIG. 7, when the total GT with respect to a certain brightness value pi reaches the reference threshold RT, the adaptive threshold AT is set. The adaptive threshold AT is divided into a brightness threshold Y_TH corresponding to a brightness value at the setting time and a color difference threshold CH_TH decided by the brightness threshold. A detailed explanation of a method of setting such two thresholds will be made later.

The operation of setting the adaptive threshold, as described above, is achieved by block units, and the adaptive threshold is stored in the adaptive threshold storage unit 241 by the adaptive threshold setting unit 240.

Because the adaptive threshold is set based on the brightness histogram of a predetermined block, in order to remove more perfectly only an undesired object of the back surface of the document except for an object of the front surface of the document, a difference between the brightness of the blocks and a difference between the color differences of the blocks may be considered.

In this embodiment, the brightness difference between the blocks is checked, and a determination is made whether the brightness difference is small or large. When the brightness difference is small, a determination is made only whether the adaptive threshold is effective. Then, the brightness threshold Y_CH and the color difference threshold CH_TH are set as the adaptive threshold applied as a reference to substantially determine whether to compensate an image.

When the brightness difference is large, a magnitude of the difference between the color differences of the blocks is further considered, and a determination is made whether the adaptive threshold is effective. Then, the brightness threshold Y_CH and the color difference threshold CH_TH are set as the adaptive threshold applied as a reference to substantially determine whether to compensate an image.

Based on the brightness threshold Y_CH and the color difference threshold CH_TH provided as the adaptive threshold of the block units set by the adaptive threshold setting unit 240, the image compensation unit 250 determines whether to compensate background color data of the brightness/color difference data of the corresponding block provided by the color coordinate converting unit 210.

The object to be compensated includes the front surface of the document, which includes the front end block Bi and the other blocks, that is, the entire scanned region. At this time, because there is no preceding block to be considered before the front end block Bi, the brightness value Y' corresponding to the initial background value IBV and the maximum allowable color difference value deltach decided by the brightness value are set respectively by the brightness threshold Y_CH and the color difference threshold CH_TH of the front end block Bi.

When the brightness of the scan data corresponding to each pixel is higher than the brightness threshold Y_CH and the color difference of the scan data corresponding to the same pixel is lower than the color difference threshold CH_TH, the image compensation unit 250 determines that the compensation for the background color is required to remove back surface noise.

If determining that the compensation is required, the image compensation unit 250 carries out the background color processing operation such that an original brightness value is disregarded and is substituted by the brightness value of the background color with respect to the scan data having the brightness value larger than the brightness threshold Y_CH. Then, the scan image is generated based on the color data in which the background color is compensated. The generated scan image is converted into the RGB color data, and the RGB color data is stored in the storage unit 300 or is transmitted to the print output unit 400 to be printed on a printing medium.

If a determination is made that the compensation is not required, the image is generated by the brightness/color difference data YCC of the document provided by the color coordinate converting unit 210 as is, and is converted into the RGB color data. Then, the RGB color data is stored in the storage unit 300, or is transmitted to the print output unit 400 to be printed on a printing medium.

Although back surface noise is generated when scanning the original document, since the image is compensated by substituting the back surface noise by the background color data through the image processing operation, and the compensated image is print-output, the image of the original document can be reproduced as is.

The image processing operation can be verified by use of a test patch.

Figure 8A:
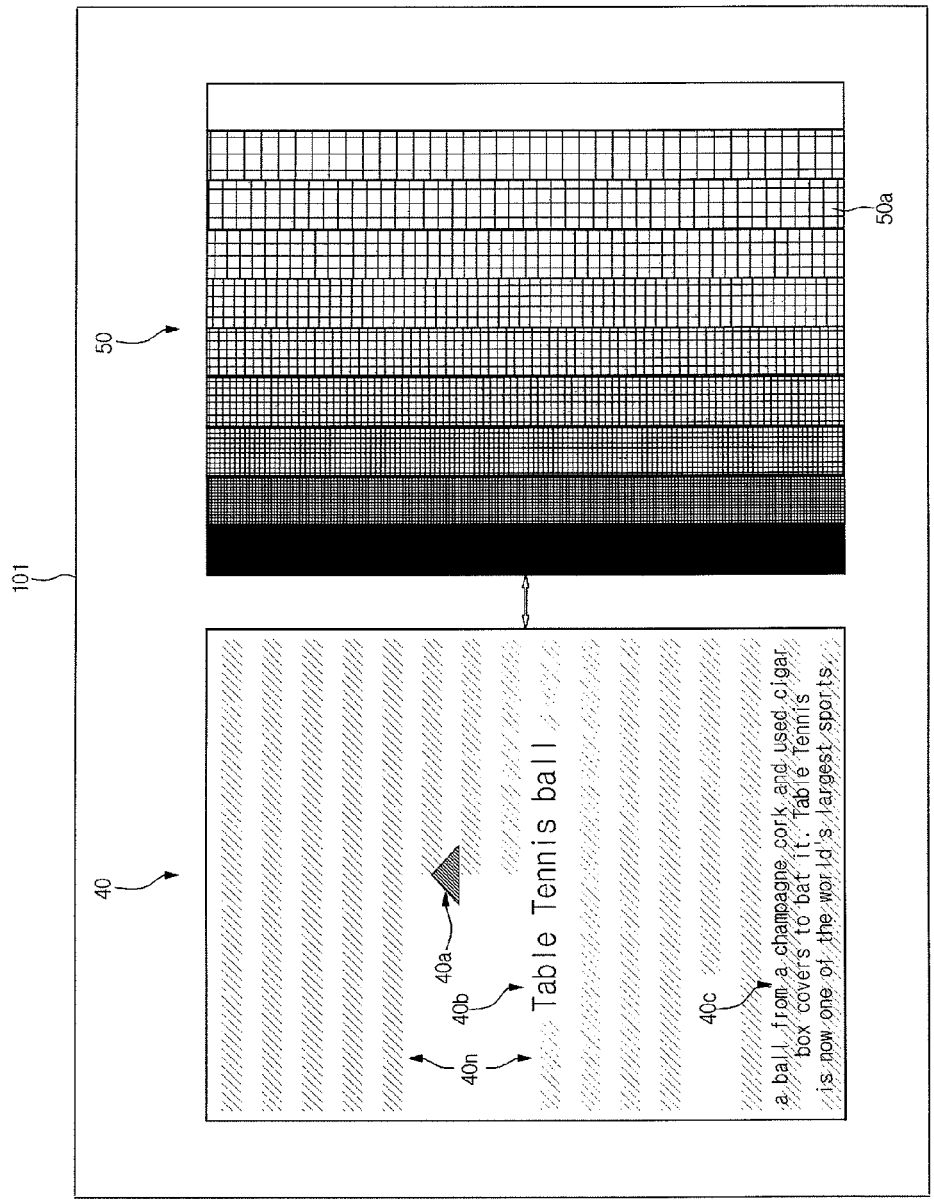
FIGS. 8A and 8B are views illustrating a method of verifying whether compensation for a scan image of a document is achieved in the image forming apparatus according to an embodiment of the present general inventive concept.

Referring to FIG. 8A, a thin document 40 and a test patch 50 are arranged parallel on a flatbed 101 of the image scanning unit 100 (FIG. 2), and are scanned on the same condition by use of the image scanning unit 100.

A front surface of the thin document 40 is printed with a picture image 40a and texts 40b and 40c, and a back surface is printed with a text 40n. The test patch 50 is formed by a thick sheet of paper, so as to prevent an occurrence of back surface noise. A front surface of the test patch 50 is formed with a pattern 50a, in which a depth of color is changed in stages.

The image scanning unit 100 (FIG. 2) scans the front surface of the thin document 40 and the test patch 50, and scan data output from the image scanning unit 100 is transmitted to the image processing device 200. The image processing device 200 sets an adaptive threshold by block units with respect to the document 40, and performs compensating operation of processing brightness/color difference of the blocks as background color data based on the adaptive threshold. At this time, the adaptive threshold with respect to the document is set independently from the scan data of the patch 50, and the adaptive threshold set by block units of the document 40 is stored in the adaptive threshold storage unit 241.

Figure 8B:
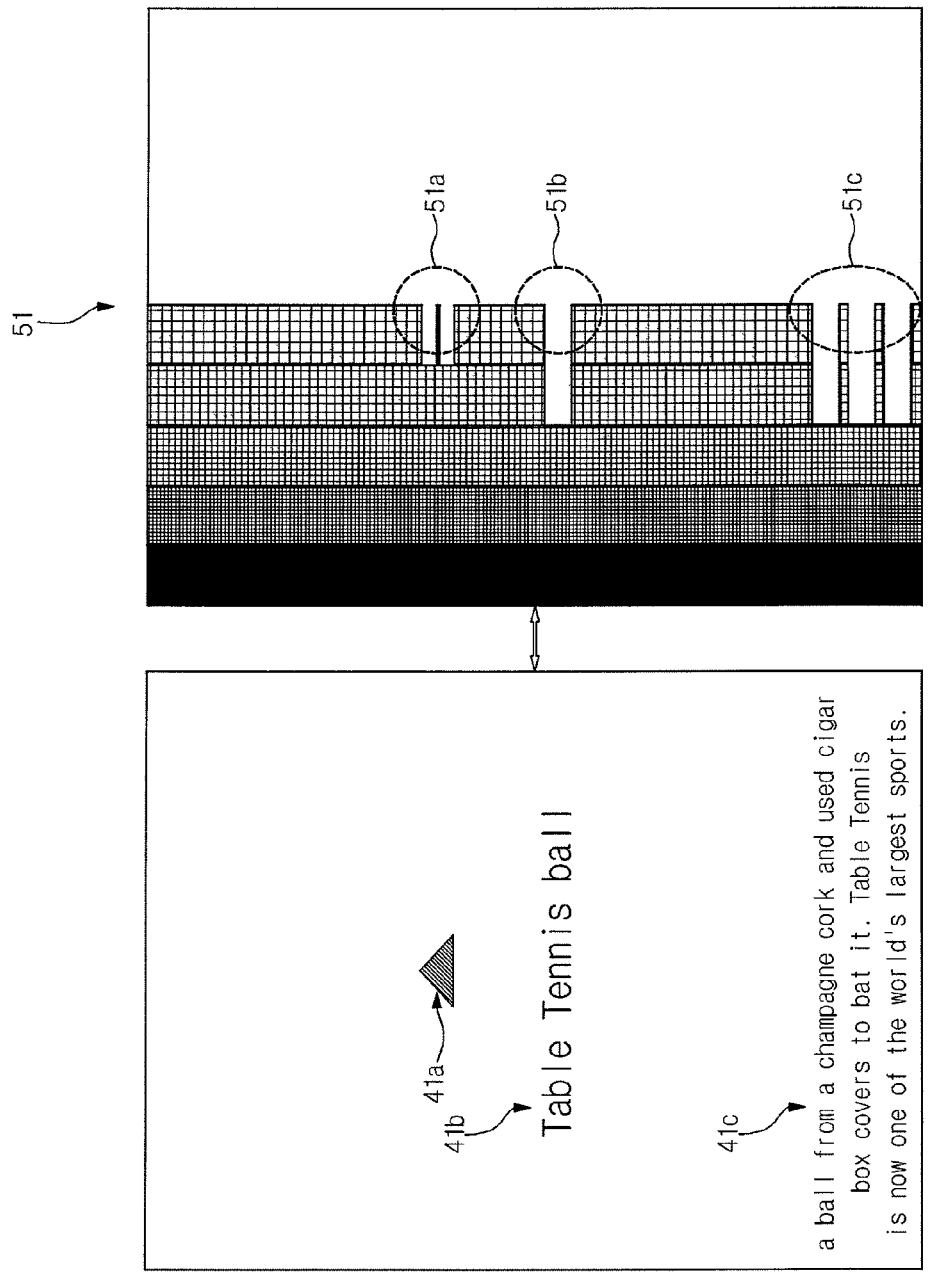

The image processing device 200 (FIG. 2) generates a scan image, which is compensated with respect to the document 40, and converts the scan image into RGB data. The RGB data is transmitted to the print output unit 400 (FIG. 2) to be print-output. As illustrated in FIG. 8b, a copied document 41, which is print-output from the print output unit 400, is printed with the picture image 41a and the texts 41b and 41c. But, the text 40n on the back surface of the original document does not appear on the copied document.

The image processing device 200 receives the scan data corresponding to the patch 50 from the image scanning unit 100, and generates an image for print output. Because the patch is formed by a thick sheet of paper, back surface noise practically does not occur. However, a scan image with respect to the pattern 50a of the patch 50 is generated by applying the adaptive threshold of block units, which has been obtained during the process of compensating the scan data of the document 40 described above and stored in the adaptive threshold storage unit 241, and is converted into RGB data. The RGB data is transmitted to the print output unit 400 (FIG. 2), so that a copied patch 51 is print-output together with the copied document 41. The pattern printing of the copied patch 51 is applied with the adaptive threshold corresponding to the picture image 41a and the texts 41b and 41c of the copied document 41. If this corresponds to a case such that back surface noise occurs in scanning the document 40 and the background data of the scan data is compensated by being applied with the adaptive threshold set by block units, the pattern printed on the copied patch 51 includes portions 51a, 51b and 51c, which appear differently from each other according to a magnitude of the adaptive threshold. Accordingly, from the pattern appearing on the copied patch 51, it can be easily verified whether the compensation for the scan data with respect to the document is achieved.

Hereinafter, a method to control the image forming apparatus according to an embodiment of the present general inventive concept will be explained.

Figure 9:
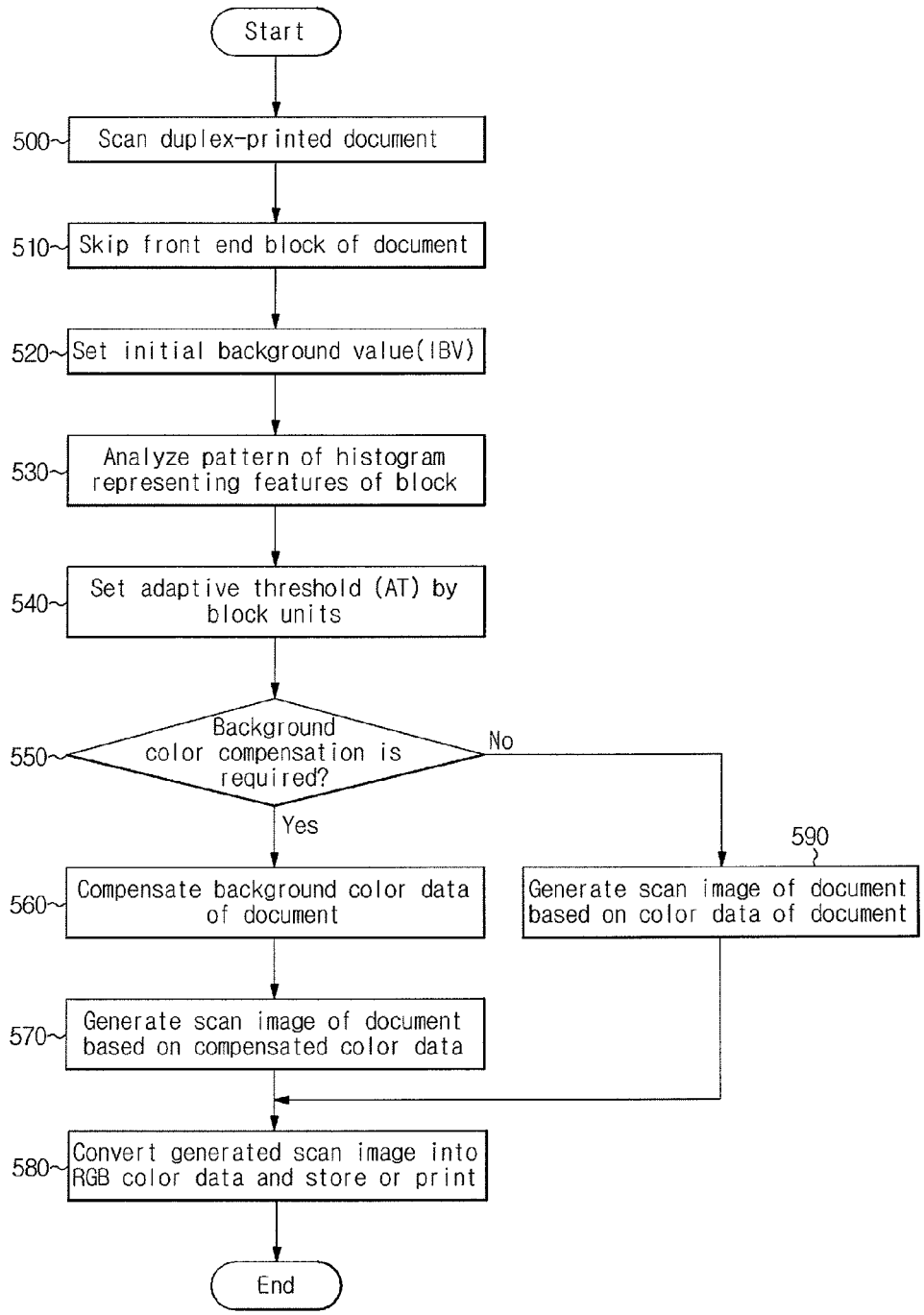
FIG. 9 is a main flow chart illustrating a control method of the image forming apparatus according to an embodiment of the present general inventive concept.

Referring to FIGS. 2, 3 and 9, the image scanning unit 100 scans a front surface of the duplex-printed document 10, and transmits the scan data to the image processing device 200 at operation 500.

The color coordinate converting unit 210 converts the RGB scan data into the brightness/color difference data YCC, and transmits the brightness/color difference data YCC to the histogram analysis unit 220. The histogram analysis unit 220 skips the front end block Bi of the document at operation 510.

Figure 10:
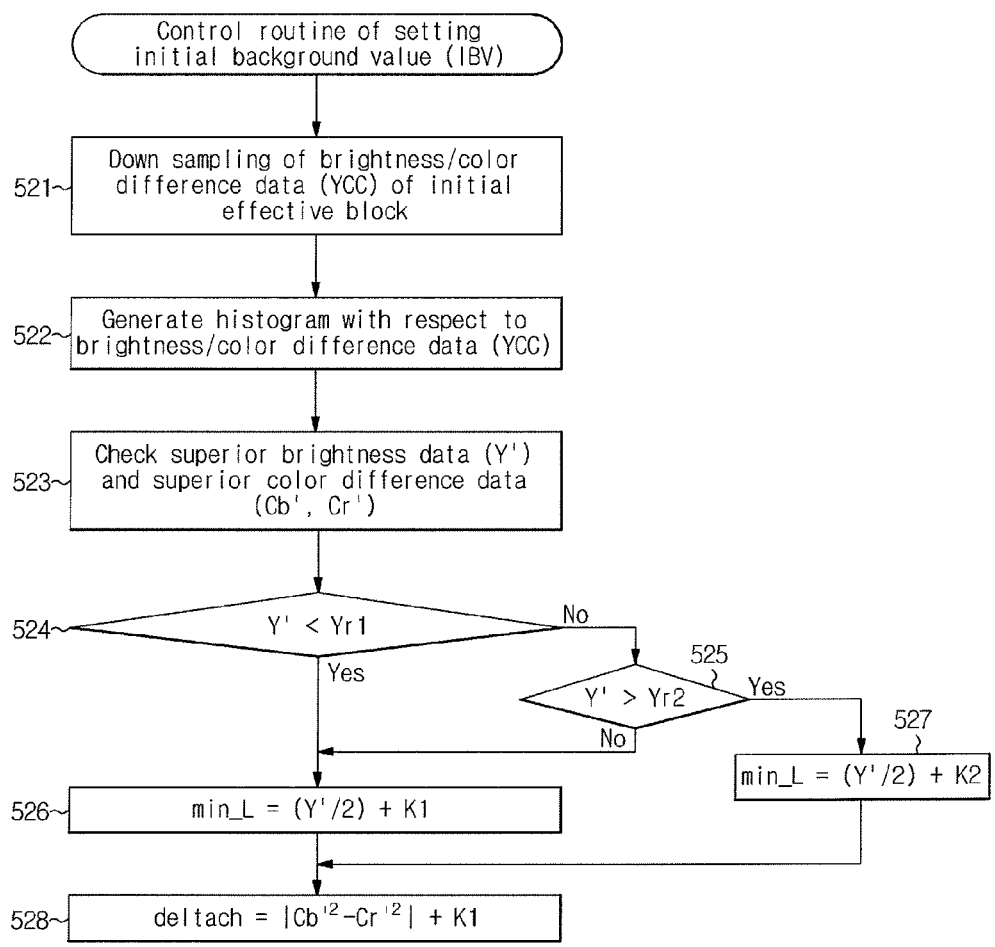
FIG. 10 is a flow chart illustrating a method of setting an initial background value according to an embodiment of the present general inventive concept.

The initial background value IBV is set at operation 520. That is, referring to FIGS. 2 and 10, the histogram analysis unit 220 transmits the brightness histogram and the color difference histogram, which are generated by down-sampling the first block B1 to ¼, to the initial background value setting unit 230 at operations 521 and 522. The initial background value setting unit 230 checks the superior brightness data Y' and the superior color difference data Cb' and Cr' of the brightness and color difference histograms at operation 523, and determines whether the superior brightness data Y' is lower than the minimum reference value Yr1 at operation 524.

If determining that the superior brightness data Y' is not lower than the minimum reference value Yr1 at operation 524, the initial background value setting unit 230 determines whether the superior brightness data Y' is higher than the maximum reference value Yr2 at operation 525.

If determining that the superior brightness data Y' is lower than the minimum reference value Yr1 at operation 524, or if determining that the superior brightness data Y' is not higher than the maximum reference value Yr2 at operation 525, the initial background value setting unit 230 sets the minimum allowable brightness value min_L from the above equation 1 at operation 526. If determining that the superior brightness data Y' is higher than the maximum reference value Yr2 at operation 525, the initial background value setting unit 230 sets the minimum allowable brightness value min_L from the above equation 2 at operation 527. Then, the initial background value setting unit 230 sets the maximum allowable color difference value deltach from the above equation 3 at operation 528.

The histogram analysis unit 220 generates the brightness histogram and the color difference histogram with respect to the blocks by block units, and transmits the histograms to the adaptive threshold setting unit 240.

Figure 11:
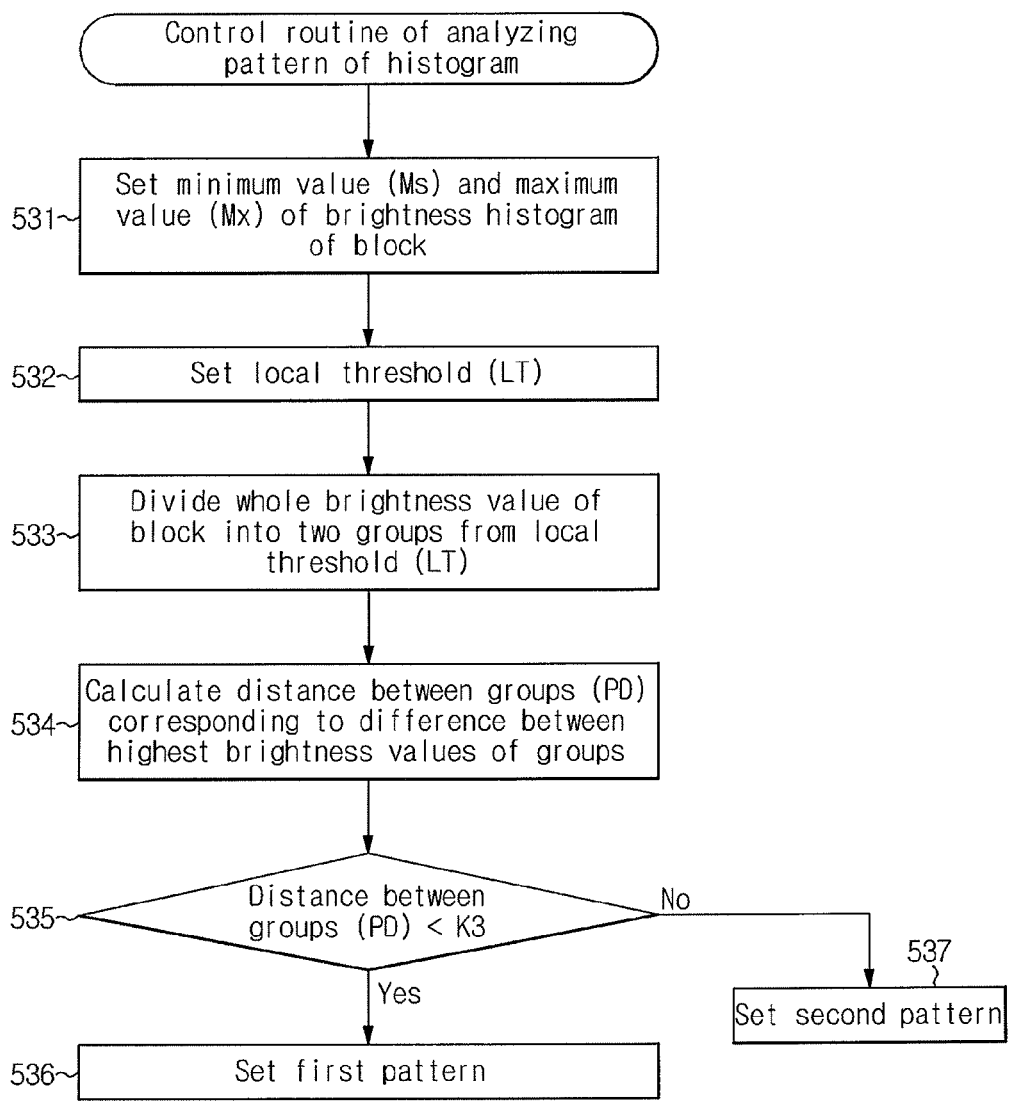
FIG. 11 is a flow chart illustrating a method of analyzing a pattern of a histogram according to an embodiment of the present general inventive concept.
Figure 12:
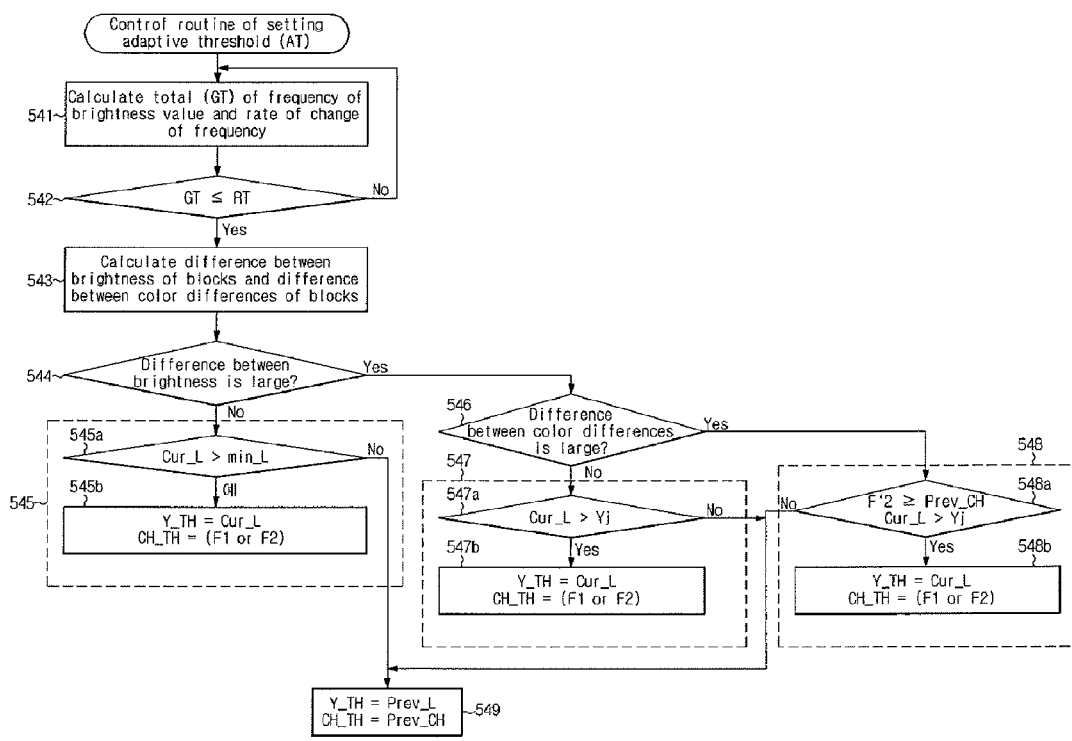
FIG. 12 is a flow chart illustrating a method of setting an adaptive threshold according to an embodiment of the present general inventive concept.

The adaptive threshold setting unit 240 analyzes the patterns of the brightness histogram and the color difference histogram, in which the features of the block are reflected, at operation 530. That is, referring to FIGS. 2 and 11, the adaptive threshold setting unit 240 sets the minimum value Ms and the maximum value Mx in the brightness histogram of the block at operation 531, and sets the local threshold LT as a middle value between the minimum value Ms and the maximum value Mx at operation 532. The adaptive threshold setting unit 240 divides the brightness values with respect to the entire pixels of the block into two groups from the local threshold LT at operation 533, and calculates the distance between groups PD, which corresponds to difference between the highest brightness value of one group and the highest brightness value of the other group, at operation 534.

A determination is made whether the distance between groups PD is smaller than the reference distance K3 at operation 535. If the distance between groups PD is smaller than the reference distance K3, a first pattern, in which the number of peaks of the bright histogram is one, is set at operation 536. If the distance between groups PD is not smaller than the reference distance K3, a second pattern, in which the number of peaks of the bright histogram is two or more, is set at operation 537.

Thereafter, the adaptive threshold setting unit 240 sets the adaptive threshold by block units according to the set pattern at operation 540. That is, referring to FIGS. 2 and 11, the adaptive threshold setting unit 240 analyzes the graph of FIG. 7 with respect to the frequency of the brightness histogram of the block. Starting from the highest brightness value px suitable for the set pattern, the adaptive threshold setting unit 240 calculates the total GT of the frequency fpx of the highest brightness value px and the rate of change e of the frequency at operation 541, and compares the total GT with the reference threshold RT at operation 542. Such comparing operation is continued until the total GT is equal to or lower than the reference threshold RT.

When the total GT reaches the reference threshold RT, the adaptive threshold at that time is set by block units, and is stored in the adaptive threshold storage unit 241. The adaptive threshold setting unit 240 calculates the brightness difference between the blocks and the difference between the color differences of the blocks, based on the stored information, at operation 543, and determines whether the brightness difference is large at operation 544. If determining that the brightness difference is not large, that is, if difference between the adaptive threshold Prev_AT of the previous block and the adaptive threshold Cur_AT of the current block is not larger than the predetermined first compensation reference value, the adaptive threshold setting unit 240 sets the brightness threshold Y_TH and the color difference threshold CH_TH according thereto at operation 545. That is, a determination is made whether the brightness value Cur_L of the current block, which is substantially equal to the adaptive threshold Cur_AT of the current block, is higher than the minimum allowable brightness value min_L at operation 545A. If determining that the brightness value Cur_L of the current block is higher than the minimum allowable brightness value min_L, the adaptive threshold setting unit 240 perceives that the setting is effective, sets the brightness value Cur_L of the current block to the brightness threshold Y_TH of the current block, and sets the color difference threshold CH_TH of the current block to either F1 or F2. Here, the color difference threshold CH_TH is calculated from the following equation 5, and is set according to a result of comparing the magnitude of the calculated color difference threshold CH_TH with F1 derived from the following equation 4.

$$F1 = Y\_TH + K4, F2 = 255 - \{((Y\_TH+1) \times Y\_TH)/K5)\} \qquad \text{Eq. 4}$$

$$CH\_TH = |(Cb'-K5)^2 - (Cr'-K5)^2| + K1 \qquad \text{Eq. 5}$$

Here, K4 equals 50, and K5 equals 128.

If the color difference threshold CH_TH calculated from the above equation 5 is higher than F1, the color difference threshold CH_TH is set to F1. If the color difference threshold CH_TH calculated from the above equation 5 is not higher than F1, the color difference threshold CH_TH is set to F2 at operation 545B.

If determining that the brightness difference is large at operation 544, that is, if the difference between the adaptive threshold Prev_AT of the previous block and the adaptive threshold Cur_AT of the current block is larger than the predetermined first compensation reference value, the adaptive threshold setting unit 240 determines whether the difference between the color difference threshold Prev_CH of the previous block and the color difference threshold Cur_CH of the current block is larger than the predetermined second compensation reference value at operation 546.

If determining that the difference between the color difference threshold Prev_CH of the previous block and the color difference threshold Cur_CH of the current block is not higher than the second compensation reference value, the adaptive threshold setting unit 240 sets the brightness threshold Y_TH and the color difference threshold CH_TH of the current block according thereto at operation 547. That is, a determination is made whether the brightness value Cur_L of the current block, which is substantially equal to the adaptive threshold Cur_AT of the current block, is higher than the reference brightness value Yj at operation 547a. If determining that the brightness value Cur_L of the current block is higher than the reference brightness value Yj, the adaptive threshold setting unit 240 perceives that the setting is effective, sets the brightness value Cur_L of the current block to the brightness threshold Y_TH of the current block, and sets the color difference threshold CH_TH of the current block to either F1 or F2 by use of the above equations 4 and 5. Here, the reference brightness value Yj is set to 100 at operation 547b. If the color difference threshold CH_TH calculated from the above equation 5 is higher than F1, the color difference threshold CH_TH is set to F1. If the color difference threshold CH_TH calculated from the above equation 5 is not higher than F1, the color difference threshold CH_TH is set to F2.

If determining that the difference between the color difference is large at operation 546, that is, if the difference between the color difference threshold Prev_CH of the previous block and the color difference threshold Cur_CH of the current block is higher than the second compensation reference value, the adaptive threshold setting unit 240 sets the brightness threshold Y_TH and the color difference threshold CH_TH according thereto at operation 548. That is, a determination is made whether the color difference threshold Prev_CH of the previous block is equal to or less than F'2 and the brightness value Cur_L of the current block is larger than the reference brightness value Yj at operation 548A. Here, F'2 is set to a double number of F2.

If determining that the color difference threshold Prev_CH is equal to or less than F'2 and the brightness value Cur_L of the current block is higher than the reference brightness value Yj at operation 548A, the adaptive threshold setting unit 240 perceives that the setting is effective, sets the brightness value Cur_L of the current block to the brightness threshold Y_TH, and sets the color difference threshold CH_TH of the current block to either F1 or F2 by use of the above equations 4 and 5 at operation 548b.

If the color difference threshold CH_TH calculated from the above equation 5 is higher than F1, the color difference threshold CH_TH is set to F1. If the color difference threshold CH_TH calculated from the above equation 5 is not higher than F1, the color difference threshold CH_TH is set to F2 at operation 548b.

When the result of determination is "No" at operations 545A, 547a and 548A, the adaptive threshold setting unit 240 perceives that the setting is not effective, sets the brightness value Prev_L of the previous block to the brightness threshold Y_TH of the current block, and sets the color difference threshold Prev_TH of the previous block to the color difference threshold CH_TH of the current block at operation 549.

Information about the brightness threshold Y_TH and the color difference threshold CH_TH, which are set as the adaptive threshold AT for every effective block, is transmitted to the image compensation unit 250.

Based on the brightness threshold Y_CH and the color difference threshold CH_TH provided as the adaptive threshold of the block units set by the adaptive threshold setting unit 240, the image compensation unit 250 determines whether to compensate the background color data of the brightness/color difference data of the corresponding block of the brightness/color difference data YCC of the original document, which is transmitted from the color coordinate converting unit 210, at operation 550. When the brightness of the scan data corresponding to each pixel is larger than the brightness threshold Y_CH of the current block and the color difference of the scan data corresponding to the same pixel is smaller than the color difference threshold CH_TH of the current block, the image compensation unit 250 determines that the compensation for the background color is required.

If determining that the compensation is required at operation 550, the image compensation unit 250 carries out the background color data compensation such that an original brightness value is disregarded and is substituted by the brightness value of the background color with respect to the scan data of each pixel, which has the brightness value higher than the brightness threshold Y_CH, at operation 560. Then, the image compensation unit 250 generates the scan image based on the color data, in which the background color is compensated, at operation 570.

If determining that the compensation is not required at operation 550, the image compensation unit 250 generates the scan image from the brightness/color difference data YCC of the original document transmitted from the color coordinate converting unit 210, at operation 590.

Whether the compensation for the background color data is achieved, the image compensation unit 250 converts the generated scan image into the RGB color data, and stores the RGB color data in the storage unit 300 or transmits the RGB color data to the print output unit 400 to print the data on a printing medium at operation 580.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As apparent from the above description, the image forming apparatus and the control method thereof can remove back surface noise due to an object printed on a region except for a desired scanned region appears in scanning a duplex-printed document.

Further, since background color data of a duplex-printed document is treated and compensated by block units, a memory of a small capacity can be used, and a treatment time can be reduced.

Further, since an adaptive threshold is set in consideration of a difference between brightness of the blocks and a difference between color differences of the blocks, treatment of background color with respect to an entire document can be accurately achieved, thereby acquiring a good image quality in spite of a compensating operation.

Still further, various embodiments of the present general inventive concept can easily and accurately verify whether compensation for a scan image is achieved, by scanning a patch having a verification pattern printed on a same condition as a document and print-outputting the patch to check the verification pattern. Accordingly, verification work to check performance of a product can be carried out at any time, and reliability of a product can be enhanced.

Although various embodiments of the present general inventive concept have been illustrated and described, it would be appreciated by those skilled in the art that changes may be made in this embodiment without departing from the principles and spirit of the general inventive concept, the scope of which is defined in the claims and their equivalents.

What is claimed is:

1. An image forming apparatus, comprising:
an image scanning unit to scan a duplex-printed document and output scan data; and
an image processing device to compensate background color data of the scan data based on an adaptive threshold which can be adapted according to a scanned region of the document,
wherein the image processing device removes an object printed on a region except for the scanned region in scanning the document.

2. The image forming apparatus according to claim 1, wherein the image processing device compensates the background color data with respect to a plurality of blocks, into which an entire scanned region of the document is divided, by block units.

3. The image forming apparatus according to claim 2, wherein the image processing device comprises:
a color coordinate converting unit to convert the scan data into brightness/color difference data; and
a histogram analysis unit to analyze a histogram of the brightness/color difference data.

4. The image forming apparatus according to claim 3, wherein the image processing device further comprises:
an adaptive threshold setting unit to set the adaptive threshold for every block according to a frequency of a brightness value and a rate of change of the frequency in the brightness histogram analyzed by the histogram analysis unit; and
an adaptive threshold storage unit to store the adaptive threshold.

5. The image forming apparatus according to claim 4, wherein the adaptive threshold setting unit sets a brightness value at the time of setting the adaptive threshold to a brightness threshold, and sets a color difference threshold corresponding to the brightness threshold.

6. The image forming apparatus according to claim 4, wherein the adaptive threshold setting unit sets a brightness threshold and a color difference threshold corresponding to the brightness threshold, based on difference between brightness of the blocks and difference between color differences of the blocks.

7. The image forming apparatus according to claim 4, wherein the image processing device includes an image compensation unit,
and wherein when brightness data of the scan data of the document is larger than a brightness threshold and color difference data corresponding to the brightness data is smaller than a color difference threshold, the image compensation unit carries out compensating operation.

8. The image forming apparatus according to claim 7, wherein the image compensation unit carries out the compensating operation by substituting the brightness value of the brightness data by a higher brightness value of the background color.

9. The image forming apparatus according to claim 2, wherein the image processing device comprises:
an initial background value setting unit to set a minimum allowable brightness value and a maximum allowable color difference value to an initial background value by use of superior brightness data and superior color difference data of the scan data extracted from any one of the plurality of blocks.

10. The image forming apparatus according to claim 9, wherein the initial background value setting unit extracts the scan data from other blocks except for certain blocks of the plurality of blocks of the document.

11. The image forming apparatus according to claim 10, wherein the initial background value setting unit excludes an upper end block of the document.

12. The image forming apparatus according to claim 10, wherein the initial background value setting unit performs down sampling in extracting the scan data.

13. A method to control an image forming apparatus, the method comprising:
scanning a duplex-printed document;
setting a minimum allowable brightness value and a maximum allowable color difference value in scan data extracted from any one block with respect to a plurality of blocks, into which an entire scanned region of the document is divided;
converting the scan data into brightness/color difference data by block units, and analyzing a brightness or color difference histogram with respect to the brightness/color difference data;
setting an adaptive threshold which can be adapted for every block according to a frequency of a brightness value and a rate of change of the frequency in the brightness histogram; and
compensating background color data of the scan data by use of the adaptive threshold set by block units.

14. The method according to claim 13, wherein the setting the adaptive threshold comprises:
setting a brightness value at a time of setting the adaptive threshold to a brightness threshold; and
setting a color difference threshold corresponding to the brightness threshold.

15. The method according to claim 13, wherein the setting the adaptive threshold comprises:
setting a brightness threshold corresponding to the adaptive threshold and a color difference threshold corresponding to the brightness threshold, based on a difference between a brightness of the blocks and a difference between color differences of the blocks.

16. The method according to claim 13, wherein the compensating the scan data is achieved when brightness data of the scan data of the document is larger than a brightness threshold and color difference data corresponding to the brightness data is smaller than a color difference threshold.

17. The method according to claim 13, wherein the compensating the scan data includes substituting the brightness value of the brightness data by a higher brightness value of the background color.

18. A method to control an image forming apparatus, the method comprising:
scanning a duplex-printed document and a test patch printed with a verification pattern to verify whether back surface noise occurring in scanning the document is compensated;
analyzing a brightness histogram by block units, into which a scanned region of the duplex-printed document is divided;
compensating background color data of scan data of the document by use of an adaptive threshold set for every block according to a frequency of a brightness value and a rate of change of the frequency in the brightness histogram; and
printing the verification pattern of the patch by applying the adaptive threshold set for every block.

19. The method according to claim 18, wherein the verification pattern is printed such that a range of a printed region is changed according to the adaptive threshold.

20. An image forming apparatus, comprising:
- an image scanning unit to scan a duplex-printed document and output scan data; and
- an image processing device to receive scan data, to remove a portion of the scan data according to a pattern of another portion of the scan data, and to identify and remove back surface noise due at least to an unwanted object scanned,
- wherein the removal of the back surface noise is accomplished through compensation of background color data.

21. The image forming apparatus of claim 20, wherein the unwanted object scanned is located on an opposite side of the duplex-printed document being scanned with respect to the image scanning unit.

22. The image forming apparatus of claim 20, wherein the background color data is compensated for by outputting the unwanted object with a same brightness as a background color.

23. The image forming apparatus of claim 20, wherein the image scanning unit scans the duplex-printed document having a first surface and a second surface opposite to the first surface to generate the scan data according to images of the first surface and the second surface of the document, such that the portion of the scan data corresponds to the image of the second surface and the another portion of the scan data corresponds to the image of the first surface.

24. The image forming apparatus of claim 20, wherein another portion of the scan data includes color data, and the color data is adjusted according to a removal of the portion of the scan data.

25. The image forming apparatus of claim 24, wherein the portion and the another portion have an area to overlap each other.

26. A method of removing an appearance of an unwanted scanned object of an image forming apparatus, the method comprising:
- scanning a duplex-printed document;
- outputting scan data;
- identifying the back surface noise due at least to an unwanted scanned object; and
- removing the identified back surface noise is accomplished through compensation of background color data.

* * * * *